US011383850B2

(12) United States Patent
Verna et al.

(10) Patent No.: US 11,383,850 B2
(45) Date of Patent: Jul. 12, 2022

(54) INTEGRATED ELECTRIC PROPULSION ASSEMBLY

(71) Applicant: BETA AIR, LLC, South Burlington, VT (US)

(72) Inventors: Raffaelo Verna, Creedmoor, NC (US); Riley Griffin, Montpelier, VT (US); Nathan Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 281 days.

(21) Appl. No.: 16/703,225

(22) Filed: Dec. 4, 2019

(65) Prior Publication Data

US 2020/0385130 A1 Dec. 10, 2020

Related U.S. Application Data

(60) Provisional application No. 62/858,281, filed on Jun. 6, 2019.

(51) Int. Cl.
*B64D 27/24* (2006.01)
*H02K 5/173* (2006.01)
*H02K 7/08* (2006.01)
*H02K 9/06* (2006.01)
*H02K 11/33* (2016.01)
*H02K 21/22* (2006.01)
(Continued)

(52) U.S. Cl.
CPC ............ *B64D 27/24* (2013.01); *H02K 5/1735* (2013.01); *H02K 7/085* (2013.01); *H02K 7/14* (2013.01); *H02K 9/06* (2013.01); *H02K 11/33* (2016.01); *H02K 21/22* (2013.01); *B64C 29/0008* (2013.01)

(58) Field of Classification Search
CPC ...... B64D 27/24; H02K 11/33; H02K 5/1735; H02K 7/085; H02K 7/14; H02K 9/06; H02K 21/22
USPC .......................................................... 310/62
See application file for complete search history.

(56) References Cited

U.S. PATENT DOCUMENTS

| 4,352,034 A | 9/1982 | Karhan et al. |
| 7,159,817 B2 | 1/2007 | VanderMey |

(Continued)

OTHER PUBLICATIONS

Stoll, Conceptual Design of the Joby S2 Electric VTOL PAV, Joby Aviation, LLC, 2014, pp. 1-6, Santa Cruz, USA.

(Continued)

*Primary Examiner* — Terrance L Kenerly
(74) *Attorney, Agent, or Firm* — Caldwell Intellectual Property Law; Keegan Caldwell; Charles Dresser

(57) ABSTRACT

An integrated electric propulsion assembly includes a stator including at least a first magnetic element generating first magnetic field. The assembly includes a propulsor with an integrated rotor, the propulsor further including a hub rotatably mounted to the stator and at least a second magnetic element affixed to the hub, the at least a second magnetic element generating a second magnetic field. At least one of the first magnetic field and the second magnetic field varies with respect to time, wherein the varied magnetic field includes generating a magnetic force between the at least a first magnetic element and the at least a second magnetic element, and the magnetic force causes the hub to rotate with respect to the stator.

19 Claims, 7 Drawing Sheets

(51) Int. Cl.
*H02K 7/14* (2006.01)
*B64C 29/00* (2006.01)

(56) References Cited

U.S. PATENT DOCUMENTS

| | | | |
|---|---|---|---|
| 8,796,895 B2* | 8/2014 | Choi | H02K 21/12 |
| | | | 310/156.43 |
| 9,694,911 B2 | 7/2017 | Bevirt | |
| 2005/0035678 A1 | 2/2005 | Ward et al. | |
| 2007/0287339 A1 | 12/2007 | Bristol et al. | |
| 2008/0292467 A1 | 11/2008 | Borgen | |
| 2009/0314591 A1 | 12/2009 | Suppiah | |
| 2012/0267974 A1 | 10/2012 | Lebenbom et al. | |
| 2014/0217840 A1 | 8/2014 | Buettner et al. | |
| 2014/0284932 A1* | 9/2014 | Sharkh | H02K 7/1838 |
| | | | 290/54 |

OTHER PUBLICATIONS

International Search Report/PCT/US2020/051396; dated Jan. 27, 2021; By: Authorized Officer Blaine R. Copenheaver.

* cited by examiner

INTEGRATED ELECTRIC PROPULSION ASSEMBLY

CROSS-REFERENCE TO RELATED APPLICATIONS

This application claims the benefit of priority of U.S. Provisional Patent Application Ser. No. 62/858,281, filed on Jun. 6, 2019, and titled "INTEGRATED ELECTRIC PROPULSION ASSEMBLY," which is incorporated by reference herein in its entirety.

FIELD OF THE INVENTION

The present invention generally relates to the field of electric aircraft propulsion assemblies. In particular, the present invention is directed to an integrated electric propulsion assembly.

BACKGROUND

In electric multi-propulsion systems such as electric vertical take-off and landing (eVTOL) aircraft, the propulsors are constrained by volumetric, gravimetric and thermal concerns. Design and assembly of the propulsor units must be done in a manner which reduces volumetric, gravimetric and thermal issues to enable efficient flight. Existing approaches to mitigating this problem are limited.

SUMMARY OF THE DISCLOSURE

In an aspect, the system is an integrated electric propulsion assembly. The assembly comprises a stator, wherein the stator further comprises at least a first magnetic element generating a first magnetic field and a propulsor with an integrated rotor. The propulsor further comprises a hub rotatably mounted to the stator and at least a second magnetic element affixed to the hub. The at least a second magnetic element generating a second magnetic field. wherein the at least a first magnetic field and the at least a second magnetic field further comprises a varying magnetic field that varies with respect to time. generating a magnetic force between the at least a first magnetic element and the at least a second magnetic element; and the magnetic force causes the hub to rotate with respect to the stator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
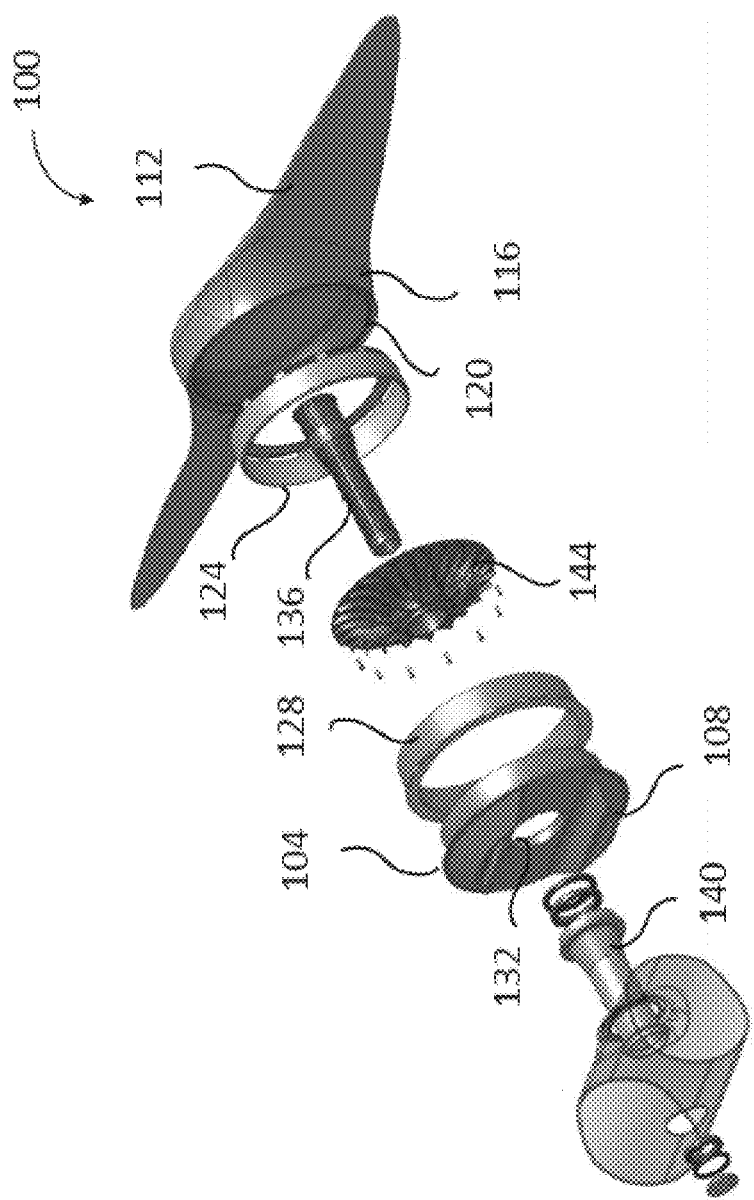
FIG. 1 is an exploded view of an embodiment of an integrated electric propulsion assembly.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Embodiments of the system disclosed herein utilize integrated electric propulsion assemblies combining a rotor of an electric motor directly into a propulsor. Such assemblies may provide thrust in electric aircraft for situations such as takeoff, landing, hovering, or high-turbulence situations. The design of an integrated electric propulsion assembly offers benefits such as weight reduction. Additional benefits may include reduced drag from wind resistance, by avoiding a higher profile assembly, such as conventional assemblies mounting propulsors to motors by way of a collar or flange. Integrated electric propulsion assemblies may be enclosed in chambers in structural elements such as wings or outriggers of electric aircraft or other vehicles; in some embodiments, an integrated electric propulsion assembly may be used to reduce drag on the structural elements which reduces the demand on the energy source enabling longer flight times, especially in critical missions or in missions where the flight plans may be changed due to unforeseen environmental circumstances encountered during flight. In some embodiments, integrated electric propulsion assemblies may have elements which also function to cool internal components during flight. In another embodiment, an integrated electric propulsion assembly is integrated into one unit allowing for ease of installation, removal, maintenance or troubleshooting.

Referring now to FIG. 1, an embodiment of an integrated electric propulsion assembly 100 is illustrated. Integrated electric propulsion assembly 100 includes at least a stator 104. Stator 104, as used herein, is a stationary component of a motor and/or motor assembly. In an embodiment, stator 104 includes at least a first magnetic element 108. As used herein, first magnetic element 108 is an element that generates a magnetic field. For example, first magnetic element 108 may include one or more magnets which may be assembled in rows along a structural casing component. Further, first magnetic element 108 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 108 may act to produce or generate a magnetic field to cause other magnetic elements to rotate, as described in further detail below. Stator 104 may include a frame to house components including at least a first magnetic element 108, as well as one or more other elements or components as described in further detail below. In an embodiment, a magnetic field can be generated by a first magnetic element 108 and can comprise a variable magnetic field. In embodiments, a variable magnetic field may be achieved by use of an inverter, a controller, or the like. In an embodiment, stator 104 may have an inner and outer cylindrical surface; a plurality of magnetic poles may extend outward from the outer cylindrical surface of the stator. In an embodiment, stator 104 may include an annular stator, wherein the stator is ring-shaped. In an embodiment, stator 104 is incorporated into a DC motor where stator 104 is fixed and functions to supply the magnetic fields where a corresponding rotor, as described in further detail below, rotates.

Still referring to FIG. 1, integrated electric propulsion assembly 100 includes propulsor 112. In embodiments, propulsor 112 can include an integrated rotor. As used herein, a rotor is a portion of an electric motor that rotates with respect to a stator of the electric motor, such as stator 104. A propulsor, as used herein, is a component or device used to propel a craft by exerting force on a fluid medium, which may include a gaseous medium such as air or a liquid medium such as water. Propulsor 112 may be any device or component that consumes electrical power on demand to propel an aircraft or other vehicle while on ground and/or in flight. Propulsor 112 may include one or more propulsive devices. In an embodiment, propulsor 112 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 112 may include at least a blade. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 112. In an embodiment, when a propulsor twists and pulls air behind it, it will, at the same time, push the aircraft forward with an equal amount of force. The more air pulled behind the aircraft, the more the aircraft is pushed forward.

In an embodiment, thrust element may include a helicopter rotor incorporated into propulsor 112. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 1, propulsor 112 can include a hub 116 rotatably mounted to stator 104. Rotatably mounted, as described herein, is functionally secured in a manner to allow rotation. Hub 116 is a structure which allows for the mechanically coupling of components of the integrated rotor assembly. In an embodiment, hub 116 can be mechanically coupled to propellers or blades. In an embodiment, hub 116 may be cylindrical in shape such that it may be mechanically joined to other components of the rotor assembly. Hub 116 may be constructed of any suitable material or combination of materials, including without limitation metal such as aluminum, titanium, steel, or the like, polymer materials or composites, fiberglass, carbon fiber, wood, or any other suitable material. Hub 116 may move in a rotational manner driven by interaction between stator and components in the rotor assembly. Persons skilled in the art, upon reviewing the entirety of this disclosure, will be aware of various structures that may be used as or included as hub 116, as used and described herein.

Still referring to FIG. 1, propulsor 112 can include a second magnetic element 120, which may include one or more further magnetic elements. Second magnetic element 120 generates a magnetic field designed to interact with first magnetic element 108. Second magnetic element 120 may be designed with a material such that the magnetic poles of at least a second magnetic element are oriented in an opposite direction from first magnetic element 108. In an embodiment, second magnetic element 120 may be affixed to hub 116. Affixed, as described herein, is the attachment, fastening, connection, and the like, of one component to another component. For example and without limitation, affixed may include bonding the second magnetic element 120 to hub 116, such as through hardware assembly, spot welding, riveting, brazing, soldering, glue, and the like.

Second magnetic element 120 may include any magnetic element suitable for use as a first magnetic element 108. For instance, and without limitation, second magnetic element may include a permanent magnet and/or an electromagnet. Second magnetic element 120 may include magnetic poles oriented in a second direction opposite of the orientation of the poles of first magnetic element 108. In an embodiment, electric propulsion assembly 100 includes a motor assembly incorporating stator 104 with a first magnet element and second magnetic element 120. First magnetic element 108 includes magnetic poles oriented in a first direction, a second magnetic element includes a plurality of magnetic poles oriented in the opposite direction than the plurality of magnetic poles in the first magnetic element 108.

Continuing to refer to FIG. 1, second magnetic element 120 may include a plurality of magnets attached to or integrated in hub 116. In an embodiment, hub 116 may incorporate structural elements of the rotor assembly of the motor assembly. As a non-limiting example hub 116 may include a motor inner magnet carrier 124 and motor outer magnet carrier 128 incorporated into the hub 116 structure. In an embodiment motor inner magnet carrier 124 and motor outer magnet carrier 128 may be cylindrical in shape. In an embodiment, motor inner magnet carrier 124 and motor out magnet carrier 116 may be any shape that would allow for a fit with the other components of the rotor assembly. In an embodiment, hub 116 may be short and wide in shape to reduce the profile height of the rotating assembly of electric propulsion assembly 100. Reducing the profile assembly height may have the advantage of reducing drag force on the external components. In an embodiment, hub 116 may also be cylindrical in shape so that fitment of the components in the rotor assembly are structurally rigid while leaving hub 116 free to rotate about stator.

In an embodiment, motor outer magnet carrier 128 may have a slightly larger diameter than motor inner magnet carrier 124, or vice-versa. First magnetic element 108 may be a productive element, defined herein as an element that produces a varying magnetic field. Productive elements will produce magnetic field that will attract and other magnetic elements, including a receptive element. Second magnetic element may be a productive or receptive element. A receptive element will react due to the magnetic field of a first magnetic element 108. In an embodiment, first magnetic element 108 produces a magnetic field according to magnetic poles of first magnetic element 108 oriented in a first direction. Second magnetic element 120 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 116 and rotor assembly may both be cylindrical in shape where rotor may have a slightly smaller circumference than hub 116 to allow the joining of both structures. Coupling of hub 116 to stator 104 may be accomplished via a surface modification of either hub 116, stator 104 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating a propulsor 112 into hub 116, a profile of integrated electric propulsion assembly 100 may be reduced, resulting in a reduced profile drag, as noted above. In an embodiment, the rotor, which includes motor inner magnet carrier 124, motor outer magnet carrier 128, propulsor 112 is incorporated into hub 116 to become one integrated unit. In an embodiment, inner motor magnet carrier 112 rotates in response to a magnetic field. The rotation causes hub 116 to rotate. This unit can be inserted into integrated electric propulsion assembly 100 as one unit. This enables ease of installation, maintenance and removal.

Still referring to FIG. 1, stator 104 may include a through-hole 132. Through-hole 132 may provide an opening for a component to be inserted through to aid in attaching propulsor with integrated rotor to stator. In an embodiment, through-hole 132 may have a round or cylindrical shape and be located at a rotational axis of stator 104. Hub 116 may be mounted to stator 104 by means of a shaft 136 rotatably inserted though through hole 132. Through-hole 132 may have a diameter that is slightly larger than a diameter of shaft 136 to allow shaft 136 to fit through through-hole 132 in order to connect stator 104 to hub 116. Shaft 136 may rotate in response to rotation of propulsor 112.

Still referring to FIG. 1, integrated electric propulsion assembly 100 may include a bearing cartridge 140. Bearing cartridge 140 may include a bore. Shaft 136 may be inserted through the bore of bearing cartridge 140. Bearing cartridge 140 may be attached to a structural element of a vehicle. Bearing cartridge 140 functions to support the rotor and to transfer the loads from the motor. Loads may include, without limitation, weight, power, magnetic pull, pitch errors, out of balance situations, and the like. a bearing cartridge 140 may include a bore. a bearing cartridge 140 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. a bearing cartridge 140 may be subject to a load which may include, without limitation, a radial or a thrust load. Depending on the location of bearing cartridge 140 in the assembly, it may see all of a radial or thrust load or a combination of both. In an embodiment, bearing cartridge 140 may join integrated electric propulsion assembly 100 to a structure feature. a bearing cartridge 140 may function to minimize the structural impact from the transfer of bearing loads during flight and/or to increase energy efficiency and power of propulsor. a bearing cartridge 140 may include a shaft and collar arrangement, wherein a shaft affixed into a collar assembly. a bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 140 may act to keep a propulsor 112 and components intact during flight by allowing integrated electric propulsion assembly 100 to rotate freely while resisting loads such as an axial force. In an embodiment, bearing cartridge 140 includes a roller bearing incorporated into the bore. a roller bearing is in contact with propulsor shaft 136. Stator 104 is mechanically coupled to inverter housing 140. Mechanically coupled may include a mechanical fastening, without limitation, such as nuts, bolts or other fastening device. Mechanically coupled may include welding or casting or the like. Inverter housing contains a bore which allows insertion by propulsor shaft 136 into bearing cartridge 140.

Still referring to FIG. 1, electric propulsion assembly 100 may include a motor assembly incorporating a rotating assembly and a stationary assembly. Hub 116, motor inner magnet carrier 124 and propulsor shaft 136 may be incorporated into the rotor assembly of electric propulsion assembly 100 which make up rotating parts of electric motor, moving between the stator poles and transmitting the motor power. As one integrated part, the rotor assembly may be inserted and removed in one piece. Stator 104 may be incorporated into the stationary part of the motor assembly. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example and without limitation, a first magnetic element 108 in electric propulsion assembly 100 may include an active magnet. For instance and without limitation, a second magnetic element may include a passive magnet, a magnet that reacts to a magnetic force generated by a first magnetic element 108. In an embodiment, a first magnet and a second magnet, positioned around the rotor assembly, may generate magnetic fields to affect the position of the rotor relative to the stator. A controller 604 may have an ability to adjust electricity originating from a power supply and, thereby, the magnetic forces generated, to ensure stable rotation of the rotor, independent of the forces induced by the machinery process. Electric propulsion assembly 100 may include an impeller 144 coupled with the shaft 136. An impeller, as described herein, is a rotor used to increase or decrease the pressure and flow of a fluid and/or air. Impeller 144 may function to provide cooling to electric propulsion assembly 100. Impeller 144 may include varying blade configurations, such as radial blades, non-radial blades, semi-circular blades and airfoil blades. Impeller 114 may further include single and/or double-sided configurations. Impeller 114 is described in further detail below.

Figure 2:
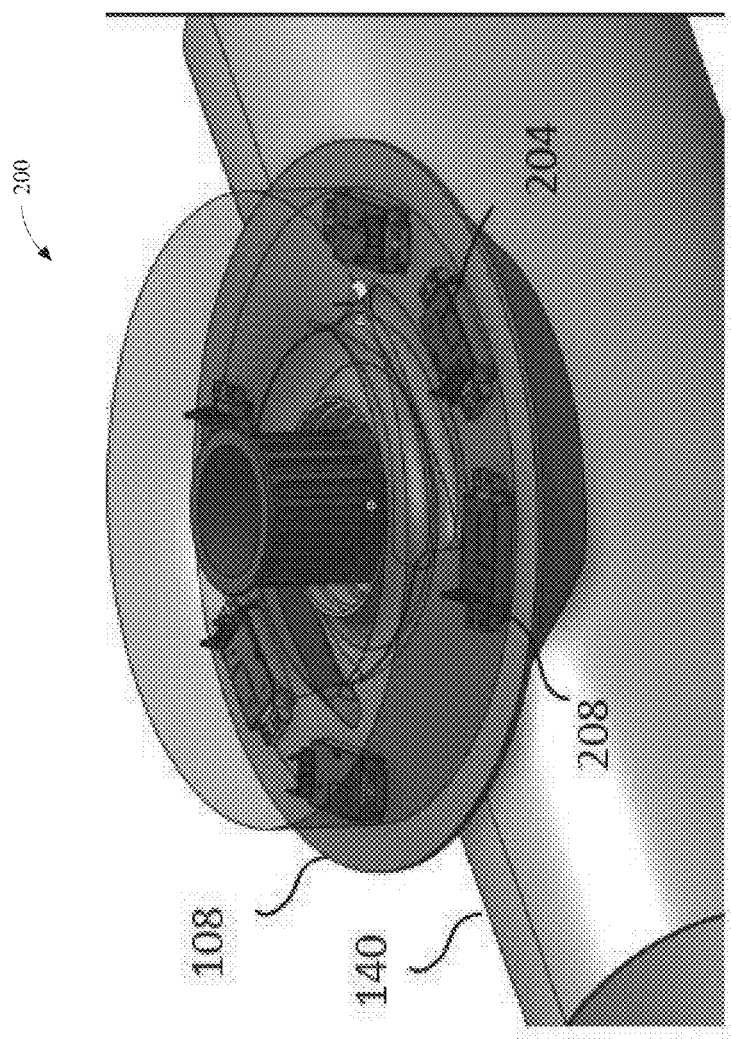
FIG. 2 is an illustration of an embodiment of a stator including an inverter.

Now referring to FIG. 2, an embodiment of an inverter housing 200 is shown. Inverter housing 200 may provide structural support to stator 104 and other components of the assembly. Inverter housing 200 may include air ducts 204. Air ducts 204 are designed to allow air flow into electric propulsion assembly 100 during use. Inverter housing may include inverters 208. Inverter 208 may function as a frequency converter and changes the DC power from a power source into AC power to drive the motor by adjusting the frequency and voltage supplied to the motor. Inverter 208 may be entirely electronic or a combination of mechanical elements and electronic circuitry. Inverter 208 may allow for variable speed and torque of the motor based on the demands of the vehicle. Inverter housing may be made of any suitable materials to enclose and protect the components of the inverter. Inverter housing 200 made me made out of varying materials such as, any metal, stainless steel, plastic or combination of multiple materials. Inverter housing 200 may be in any shape that enclosed the inverter components and fits into the assembly.

Figure 3:
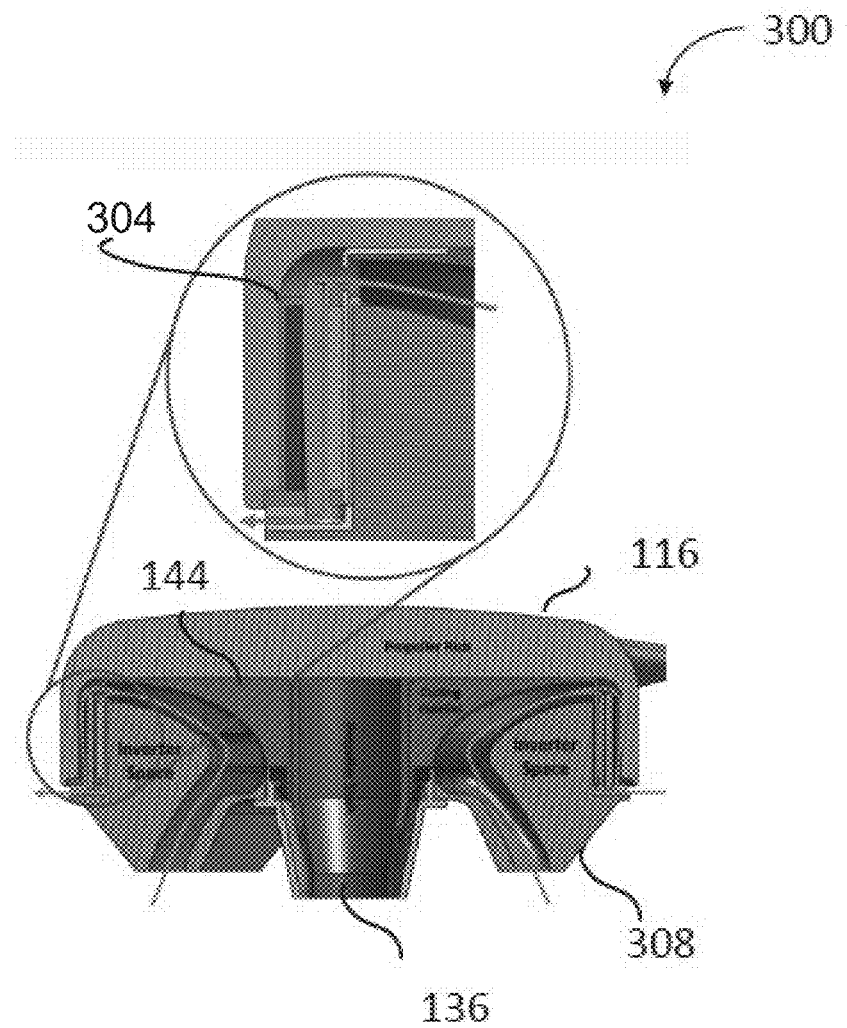
FIG. 3 is a partial cross-sectional view of an embodiment of an integrated electric propulsion assembly including a cooling apparatus.

Referring now to FIG. 3, assembly 100 may include a cooling apparatus 300. Cooling apparatus 300 may function to cool components of the integrated electric propulsion assembly 100 during operation. Cooling may help to protect internal and external components of assembly 100 from fatigue resulting from loads places during operation. During operation, components may become heated due to use, friction, current flow. Cooling apparatus 300 may be a device which has a volume of liquid which provides cooling. Cooling apparatus 300 may be a device which uses airflow to provide cooling. Cooling apparatus 300 may include channels and ducts to allow air from the environment into the integrated electric propulsion assembly 100. Cooling apparatus 300 may include an impeller 144; impeller 144 may function to direct air flow to cool integrated electric propulsion assembly 100 components. Impeller may be integrated into stator 104 and hub 116 and may include a gap 304. Gap 304 may exist between the inverter housing, impeller and stator 104 allow cooling air to flow through electric propulsion assembly 100 during use. Gap 304 may be a duct, channel, gap such as the motor rotor-stator gaps, or the like.

Still referring to FIG. 3, electric propulsion assembly 100 may include an interior space in hub 116. In an embodiment, impeller 144 may be inserted into the interior space. Interior space may include an inverter space 308. In an embodiment, impeller 144 internally installed in assembly may drive air through finned passageways in the inverter housing and through the motor rotor-stator gaps. This may remove liquid cooling requirements from a cooling element which in turn may reduce the thermal infrastructure and reduce system weight. Impeller 144 may act as a nearly passive cooling element, drawing minimal power from the motor by making use of the existing rotation of the propeller. Impeller 144 may also act as a structural element to provide rigidity in the propeller-prop shaft interface. This design may optionally include a fairing at the base of the inverter housing, to direct ambient air to the inlets in the inverter housing, as well as increasing aerodynamic performance in forward flight by blending the inverter housing to the surrounding structure. a portion of cooling apparatus 300, such as without limitation impeller, may be mechanically coupled to hub 116. Cooling apparatus 300 may include a bore which fits propulsor shaft 136 and into the interior space of hub 116. Cooling apparatus 300 and/or impeller may function to generate an air flow within the interior space when hub 116 rotates.

Figure 4:
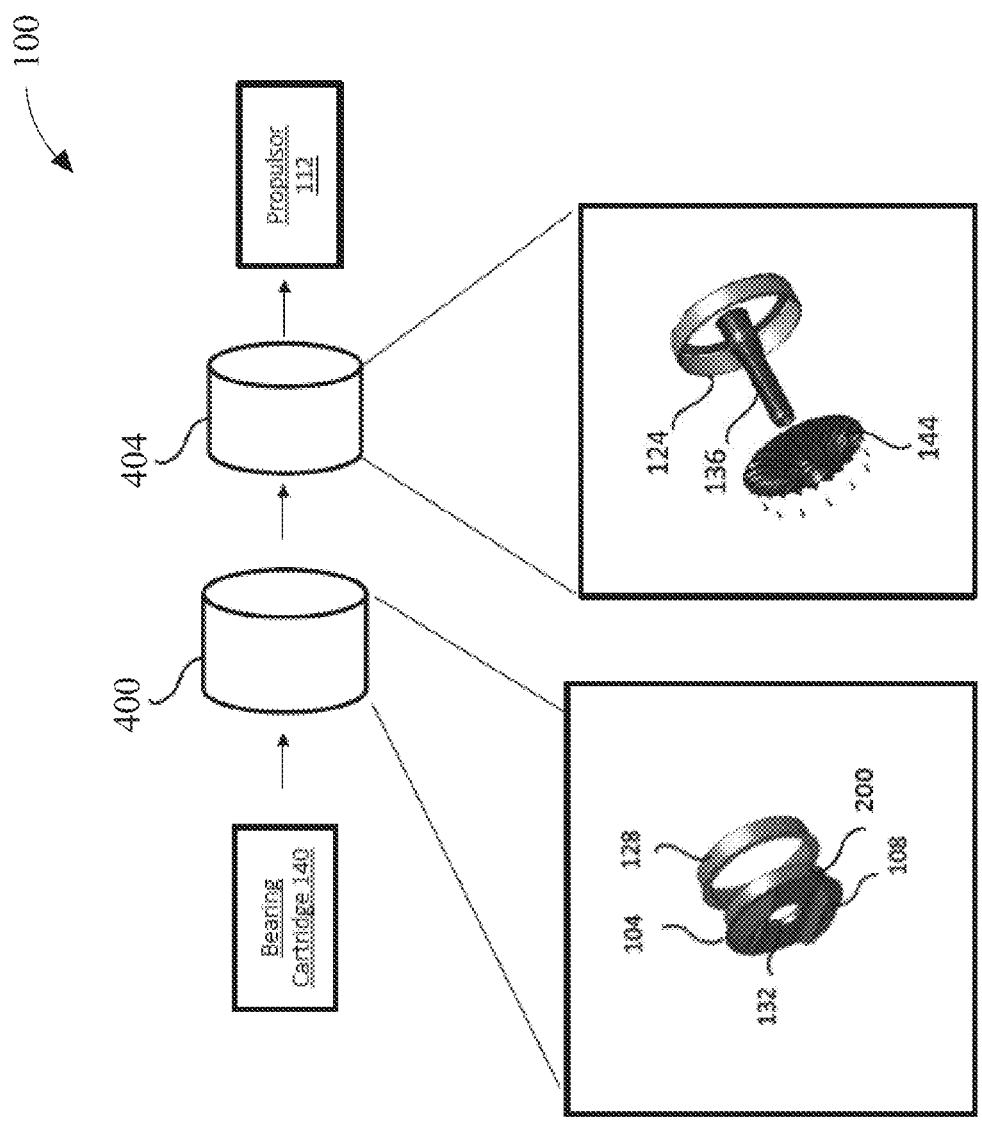
FIG. 4 is an exploded view of an embodiment of an integrated propulsion assembly.

Now referring to FIG. 4, electric propulsion assembly 100 may include a first annular cylindrical section 400 that houses a first magnetic element 108. Electric propulsion assembly 100 may further include a second magnetic element 120 may be housed in a second annual cylindrical section 404. Second annular cylindrical section 404 may fit concentrically into the first annular cylindrical section. First annular cylindrical section 400 may be constructed of any materials with appropriate properties such as, without limitation, strength and resistance to torque and other forces experienced during use, including while in air. In an embodiment, first annular cylindrical section 400 and second annular cylindrical section 404 may be integrated into hub 116. In an embodiment, first annular cylindrical section 400 may include shaft 136 which may connect impeller 144, and outer motor magnet 124 and be joined with hub 116 and propulsor 112 or another structural element. Second annular cylindrical section 404 may include stator 104, inner motor magnet carrier 128 and/or inverter housing 200 and may be joined to bearing cartridge 140 or another structural element. In this embodiment, the components contained within first annular cylindrical section 400 and second annular cylindrical section 404, when joined, will function to provide thrust for electric propulsion assembly 100. First annular cylindrical section 400 may be inserted into the second annular cylindrical section 404 concentrically as the outer diameter of first annular cylindrical section 400 is smaller than the inner diameter of the second annular cylindrical section 404.

Figure 5:
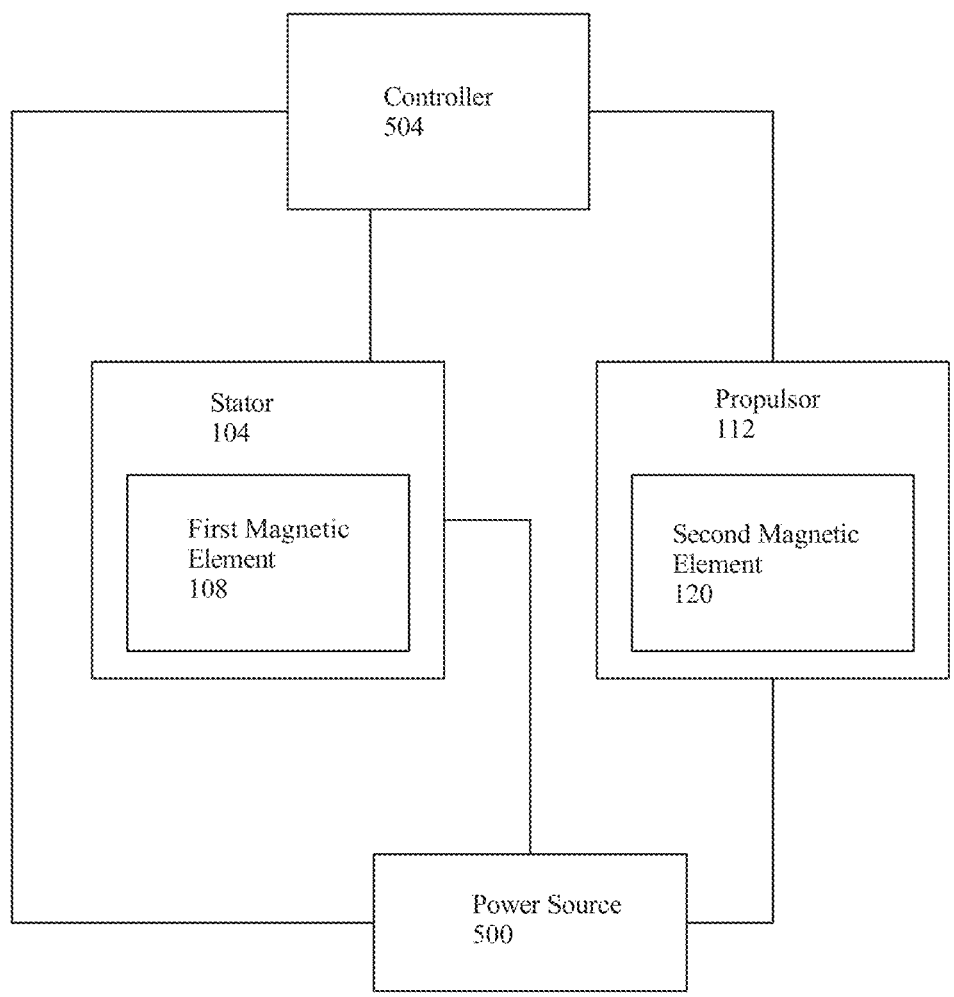
FIG. 5 is a block diagram of an embodiment of an integrated electric propulsion assembly.

Referring now to FIG. 5, a block diagram of an embodiment of an integrated electric propulsion assembly 100 is illustrated. Assembly 100 may include a power source 500 to provide electrical energy to the stator 104 for the generation of a magnetic field by the plurality of magnets. a power source 500 may be driven by direct current (DC) electric power; for instance, a power source 500 may include, without limitation, brushless DC electric motors, switched reluctance motors, or induction motors. For instance and without limitation, a power source 500 may include electronic speed controllers (not shown) or other components for regulating motor speed, rotation direction, and/or dynamic braking. Power source 500 may include or be connected to one or more sensors (not shown) detecting one or more conditions of at power source 500. The conditions may include, without limitation, voltage levels, electromotive force, current levels, temperature, current speed of rotation, and the like. The sensors may communicate a current status of power source 500 to a person operating electric propulsion assembly 100 or a computing device; computing device may include any computing device as described below in reference to FIG. 7, including without limitation a vehicle controller as set forth in further detail below. Persons skilled in the art, upon reviewing the entirety of this disclosure, will be aware of various devices and/or components that may be used as or included a power source 500 or a circuit operating a power source 500, as used and described herein. As a further example and without limitation, a power source 500 may include a battery cell. Power source 500 may be a high specific energy density energy source designed to deliver an amount of energy per mass for a period of time. Specific energy capacity is expressed in units of Wh/kg. Power sources 500 may be designed as high energy density to supply a load for extended periods of time, repeatedly. High specific power density energy sources are designed to deliver a high amount of power in a specific period of time. Specific power density is expressed in units of W/kg. Power source 500 may be designed as high-power density to be capable of delivering high amounts of power in shorter amounts of time repeatedly. In an embodiment, power source 500 include both a high specific energy source and a high specific power source with technology such as a lithium ion battery, the high specific power density energy source may have a higher voltage made available by connected the cells in series to increase the voltage than high specific energy density energy source. Some battery chemistries offer better energy density than power density and vice versa. Most lithium ion chemistries offer both qualities and are arrange and/or used to supply either energy or power or both for a given application. The application and demand on the battery for a particular period of time will determine is that particular assembly is a high energy density energy source or a high-power density energy source. For example power source 500 may include, without limitation, a generator, a capacitor, a supercapacitor, a photovoltaic device, a fuel cell such as a hydrogen fuel cell, direct methanol fuel cell, and/or solid oxide fuel cell, or an electric energy storage device; electric energy storage device may include without limitation a capacitor, an inductor, and/or a battery.

Still referring to FIG. 5, integrated electric propulsion assembly 100 may include controller 504. Controller 504 may include and/or communicate with any computing device as described in this disclosure, including without limitation a microcontroller, microprocessor, digital signal processor (DSP) and/or system on a chip (SoC) as described in this disclosure. Controller 504 may be installed in an aircraft, may control the aircraft remotely, and/or may include an element installed in the aircraft and a remote element in communication therewith. Controller 504 may include, be included in, and/or communicate with a mobile device such as a mobile telephone or smartphone. Controller 504 may include a single computing device operating independently, or may include two or more computing device operating in concert, in parallel, sequentially or the like; two or more computing devices may be included together in a single computing device or in two or more computing devices. Controller 504 with one or more additional devices as described below in further detail via a network interface device. Network interface device may be utilized for connecting a controller 504 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 504 may include but is not limited to, for example, a controller 604 or cluster of computing devices in a first location and a second computing device or cluster of computing devices in a second location. In an embodiment, controller 504 may include one or more computing devices dedicated to data storage, security, distribution of traffic for load balancing, and the like. In an embodiment, controller 504 may distribute one or more computing tasks as described below across a plurality of computing devices of computing device, which may operate in parallel, in series, redundantly, or in any other manner used for distribution of tasks or memory between computing devices. Controller 504 may be implemented using a "shared nothing" architecture in which data is cached at the worker, in an embodiment, this may enable scalability of system 100 and/or computing device.

With continued reference to FIG. 5, stator 104, including motor inner magnet carrier 124 and motor outer magnet carrier 128, may include or be connected to one or more sensors (not shown) detecting one or more conditions of a motor. The conditions may include, without limitation, voltage levels, electromotive force, current levels, temperature, current speed of rotation, and the like. Sensors, as described herein, are any device, module, and/or subsystems, utilizing any hardware, software, and/or any combination thereof to detect events and/or changes in the instant environment and communicate the information to the controller 604. For example and without limitation, a sensor may be located inside the electric aircraft; a sensor may be inside a component of the aircraft. Sensor 116 may be incorporated into vehicle or aircraft or be remote. As a further example and without limitation, sensor may be communicatively connected to the controller 504. Sensor 116 may communicate a current status of a motor to a person operating electric propulsion assembly 100 or a computing device. Computing device may include any computing device as described below in reference to FIG. 7, including without limitation a vehicle controller as set forth in further detail below. Persons skilled in the art, upon reviewing the entirety of this disclosure, will be aware of various devices and/or components that may be used as or included in a motor or a circuit operating a motor, as used and described herein.

Continuing to refer to FIG. 5, power source 500 may supply electrical power to a portion of stator 104. Electrical power, in the form of electric current, may generate a first magnetic field by first magnet element 108 and a second magnetic field by a second magnetic element 120 by use of inverter 208. A magnetic force between the first magnetic field and the second magnetic field may cause the rotor assembly of electric propulsion assembly 100 to rotate with respect to the stationary components of the motor assembly. Electric propulsion assembly 100 may include an electric motor. Electric motor may be a DC brushless motor.

Figure 6:
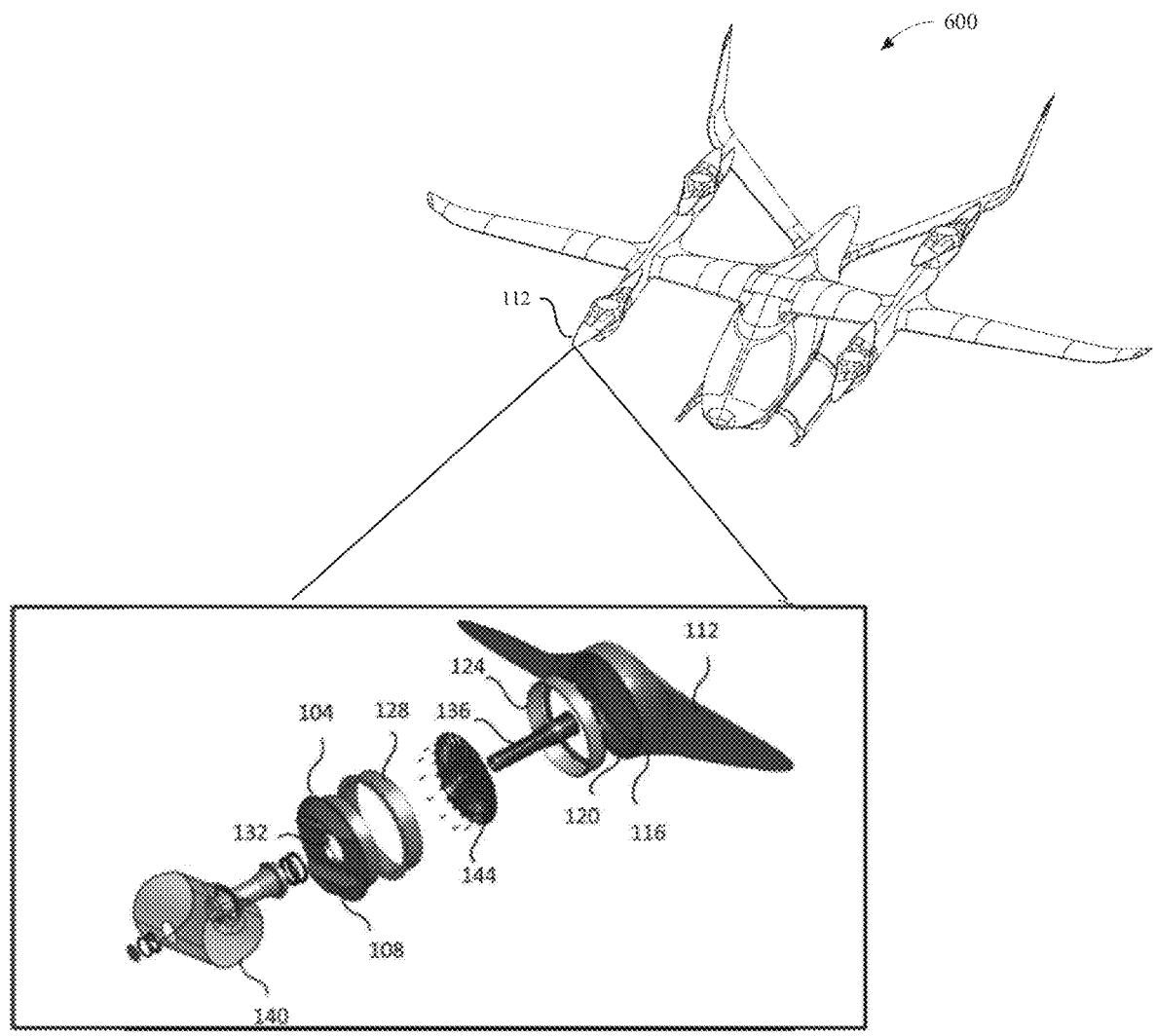
FIG. 6 is an embodiment of an integrated electric propulsion assembly incorporated in an electric aircraft.

Now referring to FIG. 6, integrated electric propulsor assembly 100 may be mounted on a structural feature. Design of integrated electric propulsion assembly 100 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge 140. Further, a structural feature may include a component of an aircraft 600. For example and without limitation structural feature may be any portion of a vehicle incorporating integrated electric propulsion assembly 100, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least a propulsor 112. Persons skilled in the art, upon reviewing the entirety of this disclosure, will be aware of various materials, combinations of materials, and/or constructions techniques.

Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor 112 of the electric aircraft. Lift generated by the airfoil may depend on speed of airflow, density of air, total area of an airfoil and/or segment thereof, and/or an angle of attack between air and the airfoil. For example and without limitation, electric aircraft 600 are designed to be as lightweight as possible. Reducing the weight of the aircraft and designing to reduce the number of components is essential to optimize the weight. In order to save energy, it may be useful to reduce weight of components of an electric aircraft 600, including without limitation propulsors and/or propulsion assemblies. In an embodiment, integrated electric propulsion assembly 100 may eliminate need for many external structural features that otherwise might be needed to join one component to another component. Integrated electric propulsion assembly 100 may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Still referring to FIG. 6, electric aircraft 600 can include at least an integrated electric propulsion assembly 100. Electric propulsion assembly 100 includes a stator 104 which has a first magnetic generating element generating a first magnetic field. Electric propulsion assembly 100 also includes a propulsor 112 with an integrated rotor assembly of the motor assembly which includes a hub 116 mounted to stator 104, at least a second magnetic element generating a second magnetic field. First magnetic field and second magnetic field vary with respect to time which generates a magnetic force between both causing the rotor assembly to rotate with respect to stator 104.

An embodiment of a stator, such as without limitation stator 104 as described above may include varying windings. Varying windings such as angularly varying windings, such as a varying winding consisting of an angled orientation to the stator, nonhomogeneous varying windings, such as varying windings consisting of differing attributes wherein the attributes may include, size, shape, location, placement, and the like, and/or any combination thereof, for instance and without limitation as described above. A stator may further include varying windings, wherein the varying windings may have a varying number of turns per section of a stator as a function of the location of the varying winding on the annular stator, for instance and without limitation as described above. A stator may include a stator shaped in an annular arrangement, wherein the annular arrangement includes windings that vary annularly around a stator, for instance and without limitation as described above. As a further example and without limitation, a stator may be configured to generate a varying magnetic field that varies with respect to time, wherein the varying magnetic field comprises a difference between a first orientation of a first magnetic field and a second orientation of a second magnetic field, as described above in reference to FIGS. 1-5. The varying magnetic field may further include generating a magnetic force between the at least a first magnetic element 108, for instance as described above, and at least a second magnetic element, for instance as described above, magnetic force may cause a hub, such as without limitation a hub 116 as described above, to rotate with respect to stator, for instance and without limitation as described above in reference to FIGS. 1-5. As another non-limiting example, a stator may interact with a rotor; the rotor may be is integrated in a propulsor, for instance and without limitation as described above in reference to FIGS. 1-5. As a further example and without limitation, a stator may interact with an alternator, as described above in further detail. The alternator, as described herein, is an electrical generator that converts mechanical energy to electrical energy in the form of alternating current. For another example, a stator may interact and/or be included in any part and/or combination of parts of a motor; wherein the motor may include any motor as described above in reference to FIGS. 1-5.

In an embodiment, the above-described elements may alleviate problems resulting from systems where weight and space of the design cause an extra demand on power source 500 of an electric aircraft. When designing a propulsion unit for an aircraft, a profile of the propulsion unit may be minimized to reduce profile drag. Reducing profile drag will reduce the demand on the power source 500 which will allow for extended flight maneuvers such as hovering. Using a hub 116 integrated with the rotating elements of integrated electric propulsion assembly 100 including rotor assembly, propulsor 112 and hub 116, may allow for ease of maintenance, installation and removal. As one integrated unit, the rotating components of integrated electric propulsion 100 form a rigid unit that can be easily separated from the stationary pieces, such as stator 104. As one unit, integrated electric propulsion assembly may be installed and removed as one piece. This may reduce maintenance time and wear and tear of the components internal to assembly 100. Reducing weight of the system also may result in a more efficient use of the power source 500 and allows for additional operational time if necessary. The reduction of weight is a result of removing components of the design of integrated electric propulsion assembly 100. Integrated cooling apparatus 300 may be designed with air ducts and channels to direct air flow from external to the aircraft and distribute that air throughout the assembly to cool components which may experience heat during use. Cooling apparatus 300 removes the needs for a cooling media and accompanying system which reduces the weight of the system.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
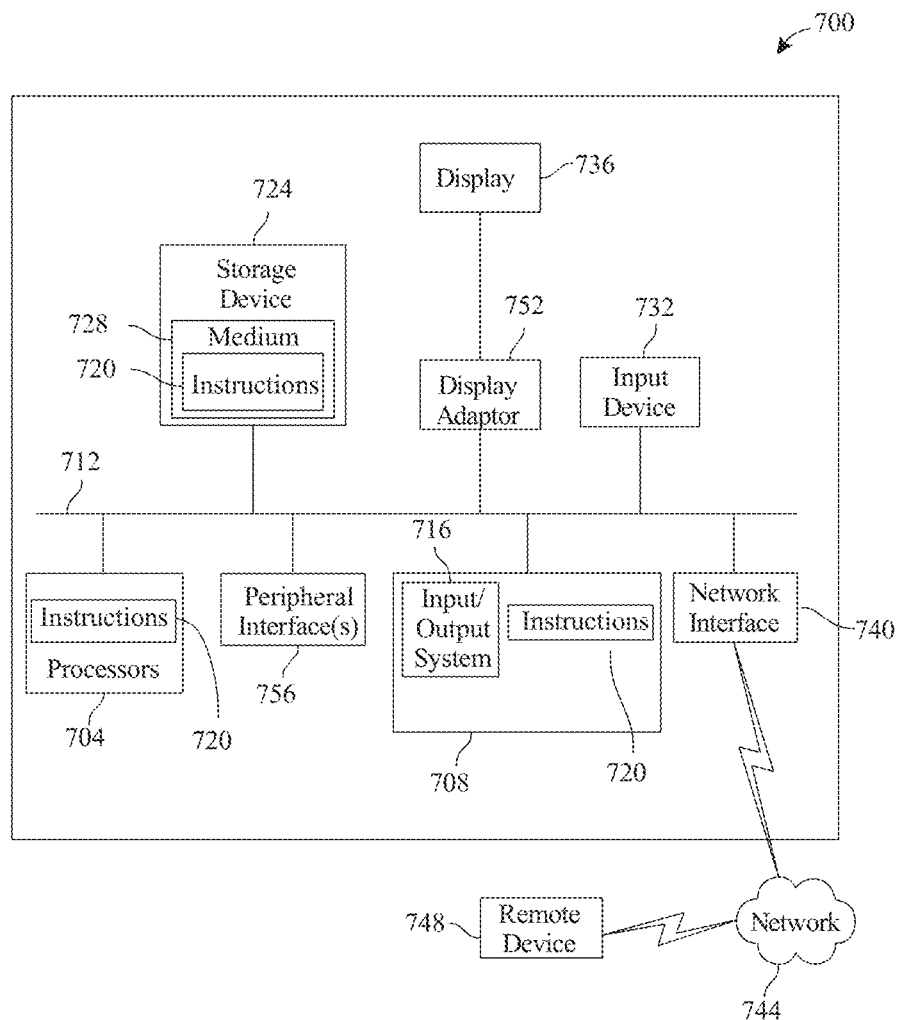
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system, such as the integrated electric propulsion assembly 100 system of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An integrated electric propulsion assembly, the assembly comprising:
   a stator, wherein the stator comprises a first magnetic element configured to generate a first magnetic field;
   a propulsor with an integrated rotor, the propulsor comprising:
   a hub rotatably mounted to the stator; and a second magnetic element affixed to the hub, the second magnetic element configured to generate a second magnetic field;

wherein at least one of a first magnetic field and the second magnetic field further comprises:

a varying magnetic field that varies, wherein the varying magnetic field generates a magnetic force between the a first magnetic element and the a second magnetic element and the magnetic force causes the hub to rotate with respect to the stator; and wherein the hub further comprises:

an interior space; and an impeller inserted in the interior space, wherein the impeller is affixed to the hub.

2. The assembly in claim 1, wherein at least a first magnetic element further comprises an electromagnet.

3. The assembly of claim 1, wherein:

the at least a first magnetic element further comprises magnetic poles oriented in at least a first direction; and the second magnetic element further comprises magnetic poles oriented in a second direction.

4. The assembly of claim 1, wherein:

the stator further comprises a through-hole; and the hub is coupled to the stator by a shaft rotatably inserted through the through-hole.

5. The assembly of claim 1, further comprising a bearing cartridge attached to a vehicle, wherein:

the bearing cartridge further comprises a bore; and at least a portion of the shaft is configured to be inserted through the bore.

6. The assembly of claim 5, wherein the bearing cartridge contains at least a roller bearing, wherein the at least a roller bearing is:

incorporated within the bore; and in contact with at least a portion of the shaft.

7. The assembly of claim 1, wherein the at least a second magnetic element further comprises at least a permanent magnet.

8. The assembly of claim 1, wherein the at least a varying magnetic field is generated by a variable supply of electric current to at least one of the first magnetic element and the second magnetic element.

9. The assembly of claim 8, wherein the variable supply of electric current comprises an inverter.

10. The assembly of claim 1, wherein:

the first magnetic element is housed in a first annular cylindrical section; and the second magnetic element is housed in a second annular cylindrical section.

11. The assembly of claim 10, wherein the second annular cylindrical section is concentric with respect to the first annular cylindric section.

12. The assembly of claim 10, wherein the first annular cylindrical section is concentric with respect to the second annular cylindrical section.

13. The assembly of claim 1, wherein the stator further comprises an outer cylindrical surface having a first radius.

14. The assembly of claim 13, wherein the hub further comprises an inner cylindrical surface having a second radius greater than the first radius.

15. The assembly of claim 14, wherein the outer cylindrical surface is concentrically inserted in the inner cylindrical surface.

16. The assembly of claim 1, wherein the impeller is configured to generate an air flow within the interior space when the hub rotates.

17. The assembly of claim 1, wherein the assembly further comprises:

a power source, wherein the power source provides electrical power to at least the stator and the rotor.

18. The assembly of claim 1, wherein the stator is affixed to a vehicle.

19. The assembly of claim 18, wherein the vehicle is an electric aircraft.

* * * * *